(12) United States Patent
Arkhipov et al.

(10) Patent No.: US 7,293,232 B2
(45) Date of Patent: Nov. 6, 2007

(54) SOURCE CODE EDITOR FOR EDITING MULTILANGUAGE DOCUMENTS

(75) Inventors: Mikhail Arkhipov, Woodinville, WA (US); Joshua Israel Kaplan, Seattle, WA (US); Timothy Michael Mc Bride, Snohomish, WA (US); Li Zhang, Sammamish, WA (US); C. Douglas Hodges, Sammamish, WA (US); Elliot H. Omiya, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 10/723,329

(22) Filed: Nov. 26, 2003

(65) Prior Publication Data

US 2005/0114769 A1    May 26, 2005

(51) Int. Cl.
*G06F 9/44* (2006.01)
(52) U.S. Cl. ......................... 715/531; 717/143
(58) Field of Classification Search ................ 715/531; 717/143
See application file for complete search history.

(56) References Cited

U.S. PATENT DOCUMENTS

| | | | |
|---|---|---|---|
| 5,586,328 | A | 12/1996 | Caron et al. |
| 5,590,336 | A | 12/1996 | Parry |
| 5,854,932 | A | 12/1998 | Mariani et al. |
| 6,083,282 | A | 7/2000 | Caron et al. |
| 6,305,008 | B1 | 10/2001 | Vaidyanathan et al. |
| 6,353,923 | B1 * | 3/2002 | Bogle et al. ................ 717/128 |
| 6,519,767 | B1 | 2/2003 | Carter et al. |
| 6,792,595 | B1 * | 9/2004 | Storistenau et al. ........ 717/110 |
| 6,799,718 | B2 * | 10/2004 | Chan et al. ................. 235/375 |

OTHER PUBLICATIONS

Darnell et al., Using Macromedia Dreamweaver 1.2, copyright May 1998 by Que, p. 41-50 and p. 90-103.*
Bodreau, et. al., NetBeans: The Definitive Guide, published by O'Reilly, Oct. 2002, printed from http://proquest.safaribooksonline.com/0596002807, p. 1-12.*
Hamilton, Software Development: Building Reliable Systems, Published by Prentice Hall, Mar. 1999, Chapter 15, Section 6, reprinted from Safari Books Online, p. 1.*
J.M. Flynn, "MAKEing Projects", Embedded Systems Programming, vol. 8, Issue 9, Sep. 1995, pp. 42-44, 46, 48, 50, 52, 54, 56.\.

* cited by examiner

*Primary Examiner*—William Bashore
*Assistant Examiner*—Amelia Rutledge
(74) *Attorney, Agent, or Firm*—Workman Nydegger (57) ABSTRACT

A source code editor is used to develop multilanguage documents while providing the advanced editing functionality of secondary editors and without requiring the programmer to explicitly open and interface with the secondary editors. The multilanguage document is presented to the user in a primary application view of the primary editor. Code segments written in different languages are identified and sent to the appropriate secondary editors, which in turn create secondary documents that are transparent to the programmer. As edits are made to the primary application view of the document, the edits are replicated by the secondary editors behind the scene. Functionality that is enabled by the secondary editors, such as syntax coloring, auto-completion, and validation is identified by the primary editor and replicated in the primary application view, so as to appear as if the primary editor is inherently configured with the leveraged functionality of the secondary editors.

27 Claims, 4 Drawing Sheets

SOURCE CODE EDITOR FOR EDITING MULTILANGUAGE DOCUMENTS

BACKGROUND OF THE INVENTION

1. The Field of the Invention

One problem with advanced editing tools and corresponding editors, however, is that they are not currently configured to extend the advanced editing features, such as validation, syntax coloring, and intellisense, to code segments that are written in different languages, even if they belong to the same file.

2. Background and Relevant Art

There are many different types of systems and environments that can be used by a computer programmer to develop code and create computer programs. These systems and environments are collectively referred to herein as Integrated Development Environments (IDE's). IDE's typically include graphical interfaces and utilize an editor having specialized tools and components for developing code in a particular language.

Many editors also provide advanced features that can make the programmer's work easier. These advanced features include such things as syntax coloring, intellisense, and validation. Syntax coloring generally involves coloring or otherwise altering the elements of a document to distinguish the various elements of the program or markup language syntax. Intellisense, also known as statement completion, occurs when the editor hints or is able to complete a partially typed expression. Validation occurs when the editor is able to detect invalid or obsolete constructs and without invoking the actual compiler. Each of these and other advanced features made available to existing editors are well known in the art.

One problem with advanced editing tools and corresponding editors, however, is that they are not currently configured to extend the advanced editing features, such as validation, syntax coloring, and intellisense, to code segments that are written in different languages, even if they belong to the same file. One reason for this is that the advanced tools work on the assumption that the programming file consists entirely of source code written in a single programming language. This, however, can be a problem when considering the current movement in computer programming. For instance, existing Microsoft ASP.NET technology currently allows Web pages to be developed that include both HTML markup as well as text in a compiler programming language such as Visual Basic or C#.

Currently, when a multilanguage page such as an ASP-.NET Web page is opened in an existing IDE or programmer editor, the multilanguage document is treated as an HTML document, and such that the advanced editor features (e.g., syntax coloring, intellisense, validation) are only provided for the recognized HTML segments, while ignoring the segments written in Visual Basic, C# and any other programming languages, thereby depriving the programmer the functionality of the advanced editing tools for various code segments.

Yet another problem with editing multilanguage documents is that certain programming technologies, such as ASP.NET permit omissions in the source code, such as, for example, the omission of class and namespace declarations, but such omissions do not permit the source code to be processed by the language compiler. Because the editor being used to edit the document may not recognize the secondary languages and omissions present in the secondary languages, however, the omissions are not readily apparent and are not automatically fixed by the editor, thereby increasing the burden on the programmer to develop and process the code.

In summary, although many existing editors provide useful advanced editing features that can help a programmer develop code, the use of the advanced features are effectively limited to the application of a single programming language. Accordingly, in order to utilize the advanced features provided by the different editors for each of the corresponding languages of a multilanguage document, it is currently necessary for the programmer to manually open the document within each of the different editors that are to be utilized and explicitly interface with the different editors, thereby increasing the burden and time required to develop the code.

BRIEF SUMMARY OF THE INVENTION

The present invention relates to methods and systems for enabling a programmer to develop multilanguage documents from a single editor, while enabling the programmer to utilize functionality that is provided by any number of secondary editors corresponding to the different programming languages present in the document, and without requiring the programmer to explicitly open or interface with the secondary editors.

In one embodiment, a multilanguage file is loaded to memory and presented in a primary application view of a primary editor. The code segments that are written in different languages are identified and sent to the correspondingly appropriate source code editors. The secondary editors then create secondary documents that are transparent to the user. In this manner, the user is unaware the secondary editors are even being utilized.

Thereafter, edits made in the primary application view are replicated to the secondary documents. The functionality of the secondary editors, in response to the edits, can then be identified and provided in the primary application view. For example, functionality provided by the secondary editors, such as, but not limited to, syntax coloring, statement completion, validation, context help, error reporting, navigation and document formatting can be recognized and duplicated in the primary application view, such that it appears to the user as if the primary editor is inherently providing the advanced editing features that are in reality being provided by a plurality of independent secondary editors.

According to other embodiments, menus (e.g., validation menus and statement completion menus) that are provided by the secondary editors can be recognized and displayed within the primary application view for utilization by the user.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to methods and systems for enabling a programmer to develop multilanguage documents from a single editor, and while enabling the programmer to utilize functionality that is provided by secondary editors that correspond to the different programming languages that are present in the document.

According to one aspect of the invention, a primary source code editor is configured to coordinate edits and incorporate functionality of one or more secondary editors during editing of a multilanguage document, thereby providing the advanced editing features of the secondary editors and without requiring the user to expressly open the secondary editors.

To aid in the interpretation of the claims and the scope of the invention, certain terms will now be defined. The term "multilanguage document", which is used interchangeably with the term "multilanguage file", refers to any document written in two or more different programming languages. The term "programming languages" should be interpreted broadly to include any programming language that can be used to develop code, including mark-up languages and other data (e.g., style) that is traditionally considered content. Some other examples of programming languages include, but are not limited to, C#, Visual Basic, C+, HTML, XML, and so forth.

The term "primary editor" refers generally to a source code editor that is configured to access a multilanguage document and to display it to a user, such as through an Integrated Development Environment (IDE) interface, in a primary application view. In some embodiments, the primary editor is configured with specific advanced editing features (e.g., syntax coloring, statement completion or intellisense, validation, context help, error reporting, navigation, document formatting, and so forth) for editing a particular language identified in the multilanguage document. However, in other embodiments, the primary editor is not configured with any of its own advanced editing features for editing an identified language of the multilanguage document.

The term "primary application view" refers to the view of the IDE in which the multilanguage document is presented for viewing by the programmer. In this regard, the primary application view is referred to as a visible view even though it is possible that the entire multilanguage document will not be displayed at the same time because of size constraints. For example, the multilanguage document may be too large to fit on a single screen of a computer even though the entire multilanguage document is available for viewing. To view unseen but available portions of the multilanguage documents the user can scroll through the document, toggling between different frame shots of the document, or otherwise access the available portions of the document. With regard to the term "visible", the entire multilanguage document is referred to a visible document when it is presented for display in the primary application view, even when certain portions of the document are not actually being displayed, but are still available for display, as described above.

The term "secondary editor" refers to a source code editor that is configured to edit one of the languages that are identified in the multilanguage document, but that is distinguished from the primary editor that is used to initially open the document. The secondary editor can comprise any source code editor that is configured to receive code segments from the primary editor and to communicate with the primary editor, such as through the buffer coordinator and view coordinator, as described below. The secondary editor is also configured to provide advanced editing features, such as validation, intellisense and syntax coloring specific to one of the languages identified in the multilanguage document. Inasmuch as the multilanguage document can include many languages, there may also be many corresponding secondary editors, each corresponding to a different one of the languages.

In certain embodiments of the invention, the secondary editors are also configured to generate secondary documents that are contemporaneously modified by the secondary editors in response to user input received by the primary editor and replicated by the secondary editors. These secondary documents are not presented to the user for viewing and can therefore be considered "invisible" documents.

Subsequent changes made to the secondary documents in response to the functionality provided by the secondary editors can then be identified and replicated by the primary editor in the primary application view. In this regard, the primary editor can "leverage" the functionality of the secondary editors that is not inherent within the primary editor.

As described herein, the embodiments of the invention can include the use of a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a CPU, to perform a certain function or group of functions.

Figure 1:
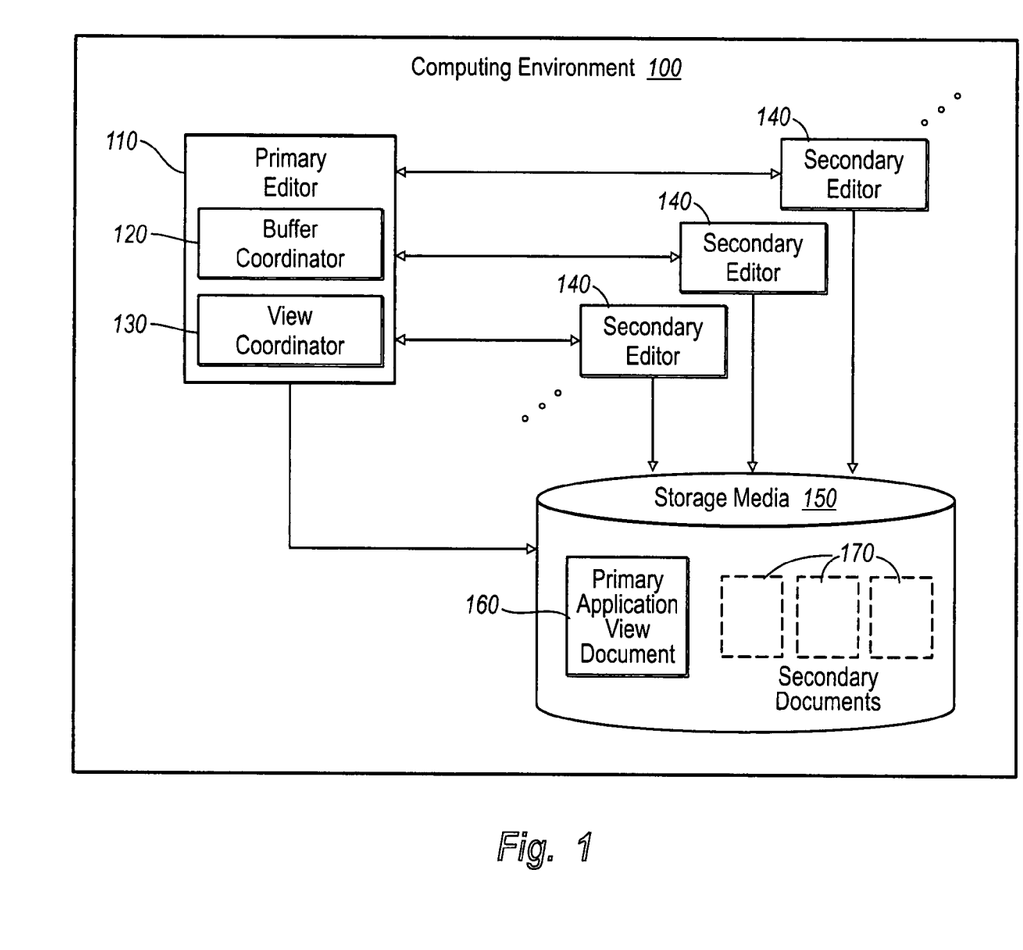
FIG. 1 illustrates a block diagram of one embodiment of a computing environment in which methods of the invention may be practiced.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

According to one embodiment, the methods of the invention may be practiced in the computing environment 100 shown in FIG. 1. The computing environment 100 includes a primary editor 110 that incorporates various computing modules, including a buffer coordinator 120 and a view coordinator 130. The computing environment 100 also includes various secondary editors 140 that are each configured to communicate with the primary editor and that each include various computing modules for developing source code written in a correspondingly appropriate language.

The computing environment 100 also includes storage media 150, which is configured to store various documents and related data developed by the primary editor 110 and the secondary editors 140. For example, the storage media 150 can store such things as the primary application view document 160 that is presented to the user, as well as the secondary documents 170 that are transparent to the user. The term transparent, in this regard, means that the secondary documents 170 are not seen by the user, as described in more detail below. The storage media 150 can also be configured to store the various computing modules of the various editors 110, 140.

Although FIG. 1 shows that the secondary documents 170 can be stored within the storage media 150, it will be appreciated that in many embodiments, the secondary documents 170 only exist during actual editing of the primary document 160 and are discarded after the primary document 160 is closed.

It will be appreciated that the storage media 150 can include one or more separate media devices, as described above, that are maintained by a single computing device or that are dispersed throughout several computing devices. In this regard, it will also be appreciated that the computing environment itself can include one or more computing devices and networks that are connected in any appropriate manner.

Editing Multilanguage Documents

Figure 2:
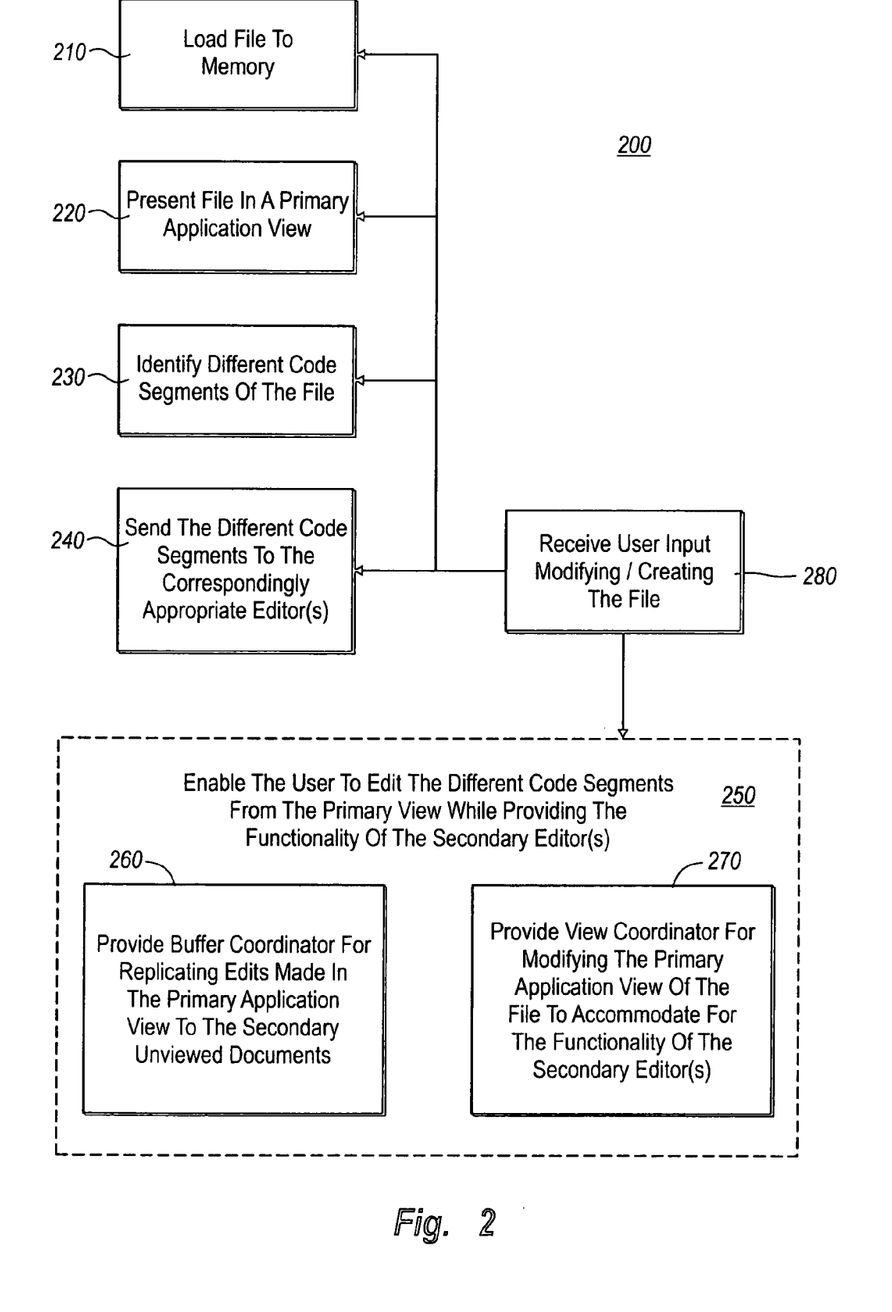
FIG. 2 illustrates a flowchart of one embodiment of a method for editing multilanguage documents.

FIG. 2 illustrates a flowchart 200 of one method for editing multilanguage documents in such a way as to utilize the functionality provided by a plurality of editors and without requiring the user to expressly open or interface with more than a single primary editor.

As shown, the method includes an initial act of loading a file to memory (act 210), this act can include the importation of a file, the creation of a file, or any other act that is sufficient for placing the file in memory so that it can be accessed by the primary editor. The memory in which the file is loaded can include storage media 150, described above.

Next, the file is accessed and presented to the user in a primary application view (act 220). For example, an IDE interface or standalone editor comprising the primary editor can open the file and display the file in a text format for editing by the user.

Traditionally, existing editors are configured to provide advanced editing functionality for only a single type of programming language. However, the present invention enables a single editor to provide advanced editing functionality for a plurality of different languages within the same document by leveraging the advanced editing functionality from different secondary editors. Accordingly, it is necessary to identify the different types of languages and code segments that are present in the document to determine which of the secondary editors need to be utilized (act 230).

Identification of the different code segments (act 230) is performed by the modules of the primary editor by scanning the multilanguage document for recognizable code elements. This can include, for example, parsing HTML file structures to find script blocks, as well as parsing page directives. Identification of different code segments (act 230) can be accomplished, according to one embodiment of the invention, by applying one or more algorithms to the identified program that are configured to recognize different programming languages. Recognizing the different code segments can also include the use of various editors that are configured to recognize different programming languages. Initial detection of the code segments can be done synchronously, on idle time or in a background thread.

Once the different code segments are identified (act 230), they are sent to the appropriate secondary editors that are configured to handle the specific syntax and programming elements of the respective code segments. For example, if a segment of code is identified as a Visual Basic (VB) code segment it will be sent to a VB source code editor, as reflected in FIGS. 3 and 4, as described below. Sending the code segments to the secondary editors can include opening the secondary editors. In some circumstances, sending the code segments to the corresponding editor (act 240) can also include sending a code segment to the primary editor when the primary editor is specifically configured to develop code written in the particular language of the identified code segment.

In some instances, the identified code segments cannot be sent straight to the corresponding editors, however, because certain necessary elements of the source code segment may be missing from the identified code segment. For example, code written in script blocks in ASP.NET Web pages does not necessarily include namespace or class namespace declarations. Likewise, declarations of certain variables may be omitted from the identified code segment. Therefore, it may be desirable for the primary editor to evaluate the file structure, directives, and the declarations made throughout the multilanguage document to rebuild a complete source code segment, when necessary, that can be effectively utilized by the corresponding secondary editor. By way of example, page directives can be analyzed to determine the name of the programming language and class names. HTML markup can be parsed to identify server-side controls. Likewise, user control identifiers can be used to declare missing class member variables.

When one of the secondary editors receives a code segment, it creates a corresponding secondary file that can be used by the secondary editor to edit the code segment. According to one preferred embodiment, although not necessarily, the secondary file is created in such a way that it is transparent or invisible to the user, such that the user is unaware that that the secondary editor is even being utilized. For example, the secondary documents can be created in a document-only mode or text-only format. In some instances, the secondary editors invoke separate language compilers to create the secondary documents. However, this is not necessarily required, depending on the particular editor implementations.

The user can then edit the different code segments of the multilanguage document directly from the primary view, while providing the functionality from the secondary editors, and without requiring the user to expressly open or interface with the secondary editors (step 200).

The step for allowing the user to edit the different code segments (step 200) with the functionality of the secondary editors can include various corresponding acts, as described below. For example, the primary editor can be configured with a buffer coordinator module (act 260) that recognizes and transmits edits made in the primary application view to the secondary editors so that they are replicated in the secondary unviewed documents as if the user had originally made the edits directly to the secondary documents within the secondary editors.

Replicating the edits to the secondary document can occur incrementally in varying degrees of granularity, such as, for example, line by line, term by term, and so forth. According to one embodiment, the edits are replicated on a key stroke by key stroke basis to increase the responsiveness to the user edits.

In some circumstances, the buffer coordinator also replicates changes from the secondary documents to the primary document, such as when a language editor automatically formats the secondary document.

To avoid infinite loops in which changes made to the primary document are replicated to the secondary document and then back to the primary document, it can be desirable for the buffer coordinator to distinguish whether the edits made by the secondary editors are either edits initiated by the secondary editors or, alternatively, events that are merely made in compliance with the edits suggested by the buffer coordinator. For example, if an edit is made to add a space between two terms in the primary document and subsequently replicated in the secondary document, it can be important to determine whether the space added to the secondary document is a replicating edit made in response to the edit in the primary document, or if instead the edit is initiated by the secondary editor, such as part of an auto formatting edit. Otherwise, the buffer coordinator could infinitely cause spaces to be added to both documents.

To distinguish between the two different types of edits, the buffer coordinator can include sufficient computer-executable instructions for tracking events, such as edits, to determine the cause of the event. In another embodiment, the buffer coordinator can be configured to replicate changes made in the secondary documents to the primary document only when the secondary editor explicitly notifies the buffer coordinator that a change needs to be made in response to functionality provided by the secondary editor.

A view coordinator can also be provided to recognize the advanced editing features of the secondary editors and to replicate these features in the primary application view of the primary editor. For example, in some circumstances, this can include the display of menus and other objects that are created by the secondary editors.

This can enable a user to respond to the advanced editing functionality provided by the secondary editor from within the primary view of the primary editor, such as for example, to enable the user to utilize menus (e.g., context help menus, navigation menus, validation menus and auto-complete menus) and other functionality generated and provided by the secondary editors.

The view coordinator can also include modules for linking the coordinates (e.g., line, column, indentation, etc.) of the code segments in the multilanguage document with the coordinates of the code segments in the secondary documents so that changes made in one of the documents can appropriately be made in the other document even though the changes may occur in different line numbers. By way of example, the view coordinator can mark sections of the original code that is presented in the primary view as well as sections of the secondary (invisible) file with markers that can be identified at a later time. According to one embodiment, the markers are language specific. For example, Visual Basic, C# and other ASP.NET compatible languages can use markers utilizing the #ExternalSource directives format. An example of marking in this manner is reflected in FIGS. 3 and 4 below.

The primary editor is also configured to map the different code segments identified in the multilanguage document, such that as the user subsequently moves a caret or mouse prompt throughout the document, the primary editor can readily recognize which of the secondary editor menus should be displayed. Accordingly, in this manner, the primary editor can dynamically and correspondingly provide different menus (e.g., context help menus) and other functionality from the various secondary editors as the editing prompt is moved throughout the document.

As described herein advanced editing functionality that can be leveraged by the primary editor from secondary editors includes, but is not limited to, syntax coloring, intellisense, document formatting, error reporting and navigation, and context help. Some examples of the foregoing will be provided below, some of which will be provided with specific reference to FIGS. 3-6.

Figure 3:
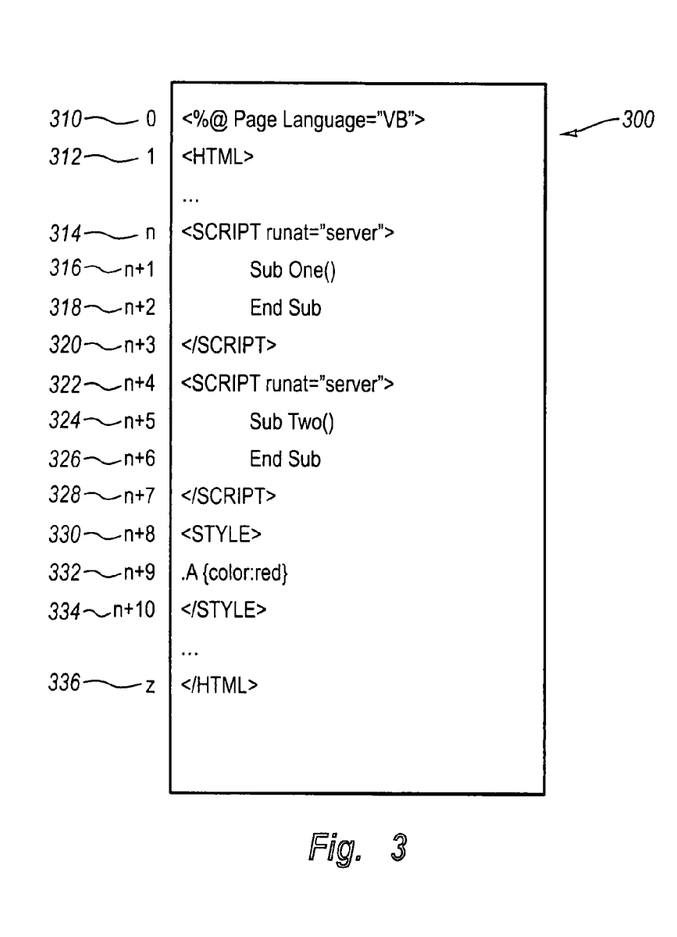
FIG. 3 illustrates one embodiment of a multilanguage document including code segments comprising Visual Basic and style.

FIG. 3 illustrates one example of a multilanguage file 300 as it might appear in a primary application view of a primary editor. As shown, the file 300 includes various lines (310, 312, 314, 316, 318, 320, 322, 324, 326, 328, 330, 332, 334 and 336) of code, numbered 0, 1, n, n+1, n+2, n+3, n+4, n+5, n+6, n+7, n+8, n+9, n+10 and z, respectively, that incorporate two different programming languages, as defined herein, namely Visual Basic (VB) and Style.

According to the methods of the invention, described above, the different segments of code corresponding to the different languages are identified and sent to the correspondingly appropriate editors that are configured to handle the syntax and elements of the code segments. In the present example, a VB code corresponding with lines n+1 (316), n+2 (318), n+5 (324) and n+6 (326) is sent to a VB code editor, see segment 400 in FIG. 4. Likewise, the Style code corresponding with line n+9 (332) is sent to a Cascading Style Sheet editor, see line 510 of FIG. 5, which represents a line of code being displayed by a Cascading Style Sheet editor.

Figure 4:
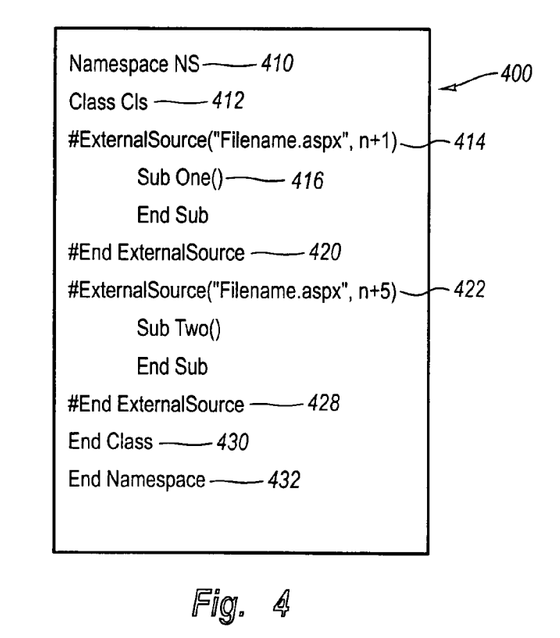
FIG. 4 illustrates one embodiment of the Visual Basic code segment from FIG. 3 that has been supplemented to create a complete code segment that is provided to a Visual Basic code editor.
Figure 5:
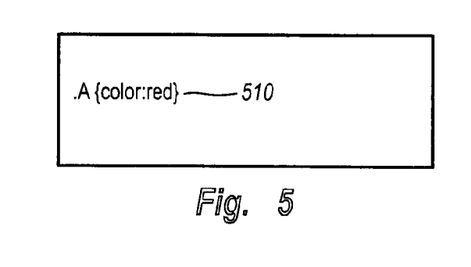
FIG. 5 illustrates one embodiment of the style code segment from the multilanguage document that is provided to a Cascading Style Sheet editor.

In FIG. 4, it is evident that the VB code segment 400 includes additional code elements that were not present in the illustrated multilanguage file 300 of FIG. 3. These additional elements, namely, the Namespace NS (410), Class Cls (412), End Class (430) and End Namespace (432) include elements that were determined to be necessary for enabling editing of the VB code segment 400 by the VB code editor and were therefore created by the primary editor prior to supplying the VB code segment 400 to the secondary editor.

Likewise, the markers 414, 420, 422 and 428 were added by the view coordinator of the primary editor prior to supplying the VB code segment 400 to the secondary editor to coordinate edits between the lines of code in the VB code segment and the corresponding lines in the multilanguage file 300. For example, if a change is made to line n+1 (316) in the multilanguage file (300), it will be known that a corresponding change should be made in line 416 of the VB code segment (400), inasmuch as the marker 414 identifies line n+1 as the beginning of the sub routine being edited at line n+1 (316).

Despite the foregoing example, it will be appreciated that different markers can be used for marking elements and regions of the code segments and that marking can occur on various levels of granularity to provide the desired level of text editing coordination.

An example of document formatting functionality will now be provided in which the following C++ text is typed into the primary application view of the primary editor:

```
if(x= =1) {
if (y= =1) {
}
```

In such a situation the corresponding C++ code editor would format the code by adding the appropriate indentation and brackets, such that that the code would appear as the following:

```
if(x = = 1)
{
    if (y = = 1)
    {
    }
}
```

Once the reformatting of the secondary editor was provided, the reformatting changes could be replicated in the primary application view, as described above, through the use of the buffer coordinator and the view coordinator.

Figure 6:
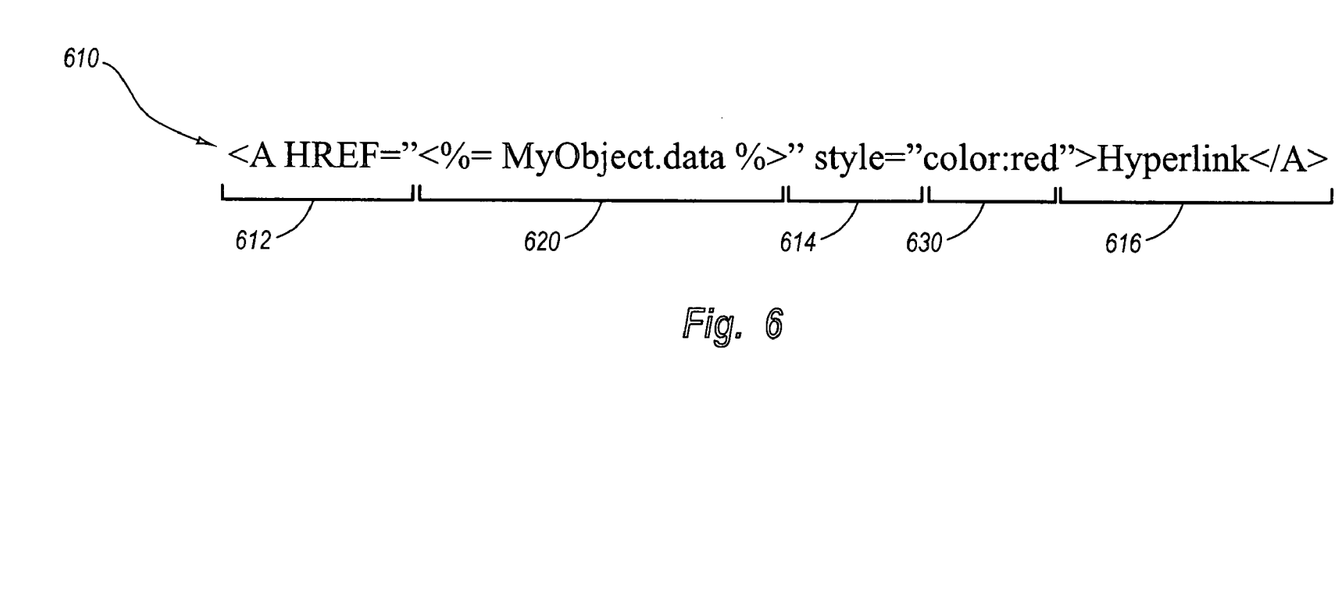
FIG. 6 illustrates one embodiment of a single line of code that includes multiple code segments.

Attention is now directed to FIG. 6, which illustrates a line of code 610. This illustration is provided to illustrate how the invention also extends to embodiments in which multiple language elements are used in the same line of code. As shown, the line of code 610 includes HTML elements 612, 614, 616 as well as style 630 and server VB code 620 elements. It should be appreciated from this illustration that the techniques and methods described above with reference to coordinating edits between the primary and secondary editors also apply to embodiments in which the multilanguage file consists of a single line or includes lines incorporating multiple language elements.

For example, with regard to syntax coloring, the various HTML code elements 612, 614, 616 would be sent to a HTML editor to determine how the elements should be colored. Element 620 would be sent to a VB editor to determine color. Likewise, element 630 would be sent to a Cascading Style Sheet editor to determine what color should be applied to that element. Thereafter, the primary editor uses this information, obtained from the secondary editors, to color the various code elements appropriately.

In summary, it should now be appreciated from the foregoing descriptions and examples that the present invention extends broadly to any embodiment in which an editor leverages and provides the functionality from other editors and without requiring a user to explicitly open or interface with the secondary editors.

One benefit of the present invention is that a programmer can receive the full benefit of a primary editor while working with the primary editor and at the same time receive the full functionality provided by one or more secondary editors when working within sections of a multilanguage file consisting of code written in languages supported by the secondary editors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for permitting a user to edit a multilanguage document having code segments written in a primary language and one or more code segments written in one or more secondary languages, the method permitting the user to perform editing of the multilanguage document from a single primary editor designed to provide advanced editing functionality for the primary language, while also enabling the user to utilize advanced editing functionality of one or more secondary editors to edit the one or more secondary languages, and in such a way that the user is not required to open or interface with the secondary editors, the method comprising:

displaying a multilanguage document in a primary application view of a primary editor which provides editing functionality for the primary language of the multilanguage document;

identifying code segments of the multilanguage document that are written in the primary language and identifying at least one other code segment written in a secondary programming language;

the primary editor mapping each code segment identified in the multilanguage document;

without requiring the user to leave the primary application view to open or interface with the secondary editors, enabling the user to edit the different code segments of the multilanguage document from within the primary application view by editing code segments written in the primary language with the primary editor, sending the at least one other code segment written in a secondary programming language to the corresponding secondary editor, based upon the position of a mouse prompt and upon the mapping of each code segment identified in the multilanguage document, displaying secondary editor menus within the primary application view, the secondary editor menus comprising context help menus, navigation menus, and validation menus, editing the at least one other code segment written in a secondary programming language through interaction with the corresponding secondary editor; and displaying the multilanguage document including the edits made to the at least one other code segment written in secondary programming language within the primary application view.

2. A method as recited in claim 1, wherein the secondary editor is specifically configured for editing code written in a language of the received code segment.

3. A method as recited in claim 1, wherein the secondary file is transparent to the user.

4. A method as recited in claim 3, wherein the secondary file is created in a text-only format.

5. A method as recited in claim 1, wherein the primary editor modifies the multilanguage document in response to a change made to the secondary file.

6. A method as recited in claim 1, wherein the multilanguage document is modified in response to advanced editing features of the secondary editor that are not inherently enabled by the primary editor.

7. A method as recited in claim 6, wherein the advanced editing features include at least one of syntax coloring, statement completion, document formatting, error reporting, and context help.

8. A method as recited in claim 1, further comprising:

identifying whether the at least one other code segment written in a secondary programming language is a complete code segment, and when not, supplementing the at least one other code segment with additional data necessary to create complete source code for the at least one other code segment so that it can be recognized and edited by the secondary editor having advanced editing functionality for the language of the at least one other code segment and having editing functionality not available within the primary editor; and the primary editor modifying the primary application view of the multilanguage document to accommodate the advanced editing functionality and the editing functionality not available within the primary editor provided by the secondary editor as to the at least one other code segment in the secondary language.

9. A method as recited in claim 8, wherein modifying the primary application view includes displaying a menu created by the secondary editor.

10. A method as recited in claim 8, wherein modifying the primary application view includes editing the multilanguage file and replicating one or more edits made by the secondary editor to the secondary file.

11. A method as recited in claim 10, wherein the one or more edits made in the secondary file include edits made in response to functionality provided by the secondary editor that are not inherently available to the primary editor.

12. A method as recited in claim 10, wherein the functionality provided by the secondary editor includes at least one of syntax coloring, statement completion, document formatting, error reporting, and context help.

13. A method as recited in claim 12, further including, prior to replicating the one or more edits made in the secondary document, an act of determining that the one or more edits made in the secondary file are not merely a result of replication of the edits made by the primary editor to the multilanguage file in the primary view.

14. A method as recited in claim 8, further including, prior to replicating edits made to the multilanguage file in the primary application view to the secondary file, an act of determining that the one or more edits made in the primary application view are not merely a result of replication of the edits made by the secondary editor to the secondary file.

15. A computer program product comprising one or more physical computer-readable media having computer executable instructions for implementing a method for permitting a user to edit a multilanguage document having code segments written in a primary language and one or more code segments written in one or more secondary languages, wherein the method permits the user to perform editing of the multilanguage document from a single primary editor designed to provide advanced editing functionality for the primary language, while also enabling the user to utilize advanced editing functionality of one or more secondary editors to edit the one or more secondary languages, and in such a way that the user is not required to open or interface with the secondary editors, the method being that recited in claim 1.

16. A computer program product as recited in claim 15, wherein the secondary editor is specifically configured for editing code written in a language of the received code segment.

17. A computer program product as recited in claim 15, wherein the secondary file is transparent to the user.

18. A computer program product as recited in claim 15, wherein the primary editor modifies the multilanguage document in response to a change made to the secondary file.

19. A computer program product as recited in claim 15, wherein the multilanguage document is modified in response to advanced editing features of the secondary editor that are not inherently enabled by the primary editor.

20. A computer program product as recited in claim 19, wherein the advanced editing features include at least one of syntax coloring, statement completion, document formatting, error reporting, and context help.

21. A computer program product comprising one or more physical computer-readable media having computer executable instructions for implementing a method for permitting a user to edit a multilanguage document having code segments written in a primary language and one or more code segments written in one or more secondary languages, wherein the method permits the user to perform editing of the multilanguage document from a single primary editor designed to provide advanced editing functionality for the primary language, while also enabling the user to utilize advanced editing functionality of one or more secondary editors to edit the one or more secondary languages, and in such a way that the user is not required to open or interface with the secondary editors, the method being that recited in claim 8.

22. A computer program product as recited in claim 21, wherein modifying the primary application view includes displaying a menu created by the secondary editor.

23. A computer program product as recited in claim 21, wherein modifying the primary application view includes editing the multilanguage file to replicate one or more edits made by the secondary editor to the secondary file.

24. A computer program product as recited in claim 23, wherein the one or more edits made in the secondary file include edits made in response to functionality provided by the secondary editor that are not inherently available to the primary editor.

25. A computer program product as recited in claim 23, wherein the functionality provided by the secondary editor includes at least one of syntax coloring, statement completion, document formatting, error reporting, and context help.

26. A computer program product as recited in claim 21, further including, prior to replicating the one or more edits made in the secondary file, the buffer coordinator determining that the one or more edits made in the secondary file were not made merely to replicate the edits made by the primary editor, so as to avoid an infinite loop of edits being made.

27. A computing system comprising one or more computer processors, computer-readable storage media, and a computer display and upon which is executing the method of claim 1.

* * * * *